United States Patent [19] [11] 4,117,737
Mulholland et al. [45] Oct. 3, 1978

[54] DRIVE BELT LOADING SYSTEM

[75] Inventors: Patrick John Mulholland, Eastleigh; Colin Arthur Thomas, Alresford, both of England

[73] Assignee: International Business Machines Corporation, Armonk, N.Y.

[21] Appl. No.: 746,904

[22] Filed: Dec. 2, 1976

[30] Foreign Application Priority Data

Dec. 29, 1975 [GB] United Kingdom ............... 52961/75

[51] Int. Cl.² .......................... F16H 7/22; F16H 7/08; F16H 7/10; G11B 17/00
[52] U.S. Cl. .................................... 74/242; 74/242.7; 74/242.8; 74/242.11 R; 74/242.12; 360/98
[58] Field of Search .................... 74/242, 242.6, 242.7, 74/242.8, 242.3, 242.12, 242.13 R, 242.1 TA, 242.4, 242.9, 242.11 R; 346/137; 360/98, 97, 99

[56] References Cited

U.S. PATENT DOCUMENTS

| 1,167,440 | 1/1916 | Sipp | 74/242.4 |
| 2,183,258 | 12/1939 | Harman | 74/229 |
| 3,248,961 | 5/1966 | Bortzfield et al. | 74/242.3 |
| 3,741,026 | 6/1973 | Franzen | 74/242.9 |

Primary Examiner—Samuel Scott
Assistant Examiner—William R. Henderson
Attorney, Agent, or Firm—R. E. Cummins

[57] ABSTRACT

A drive belt loading system for automatically loading and unloading a drive belt onto a pulley of a removable device employs a conical transfer means for automatically transferring the drive belt to the pulley upon tensioning of the belt. The transfer means is located below the device pulley so that upon slackening of the belt, the belt is automatically unloaded by dropping back onto the transfer means to allow removal of the device. The system is applied to drive belt loading in a magnetic disk file employing a disk module with an external pulley.

6 Claims, 3 Drawing Figures

DRIVE BELT LOADING SYSTEM

BACKGROUND OF THE INVENTION

1. Field of the Invention

The invention relates to drive belt loading systems and to magnetic disk drives employing such systems.

2. Description of the Prior Art

A drive belt loading system for use in a magnetic disk file is shown in FIGS. 2A and 2B of U.S. Pat. No. 3,786,454 to Lissner and Mulvany. In that patent a pair of spring biased idler arms are employed in a disk drive to splay apart a drive belt and enable the receipt of a data module pulley within the loop formed by the belt. A loading mechanism moves the data module so that its pulley contacts the belt and overcomes the action of the idler arms which are then pivoted inwardly. Loading motion of the module also moves a belt drive motor, mounted on a pivot plate, against a spring bias. A cam on the pivot plate strikes the idler arms and forces them to a position out of contact with the belt. Reversal of the above procedure unloads the belt and permits removal of the module. The Lissner and Mulvany arrangement requires both motion of the module and the drive motor to effect loading and is relatively complex.

United Kingdom Pat. No. 593,780 shows an arrangement for coupling two horizontal shafts for co-rotation by means of a belt. The belt is placed on an idler pulley on one shaft and is manually shifted from a perch to a conical portion of a pulley fixed to a second shaft. Rotation of the shaft causes the belt to climb the conical portion of the second shaft pulley and at the same time to transfer from the first shaft idler pulley to an adjacent pulley fixed to the first shaft. Thus the two shafts are coupled for rotation together. However, this coupling is not automatic and neither shaft is part of a removable device.

SUMMARY OF THE INVENTION

It is an object of the present invention to provide a new and simplified drive belt loading system for automatically loading and unloading a drive belt to a removable device.

It is a further object of the invention to provide an automatic drive belt loading system employing tensioning and slackening of a drive belt together with gravity to effect loading and unloading of the belt.

These and other objects of the invention are achieved in a drive belt loading system in which a belt is maintained in contact with a drive motor output shaft and, when unloaded, rests on a tapering transfer device located below the connecting shaft or pulley of a removable device which is to be driven. Means for tensioning the belt move it up the transfer device and transfer it to the connecting shaft or pulley of the removable device which is thereby coupled to be driven by the drive motor output shaft. When the same means are used to slacken the belt, it drops from the driven shaft or pulley back to the transfer means and allows removal of the removable device.

Brief Description of the Drawings

In order that the invention may be more readily understood, reference will now be made, by way of example, to the accompanying drawings in which:

In FIG. 1A a crown drive pulley 2 is rigidly attached to a vertical shaft 4 of an electrical motor 6. Drive pulley 2 has an integral flange 8 on its lower side adjacent to the motor 6. An endless drive belt 10 is supported by flange 8.

Figure 1A:
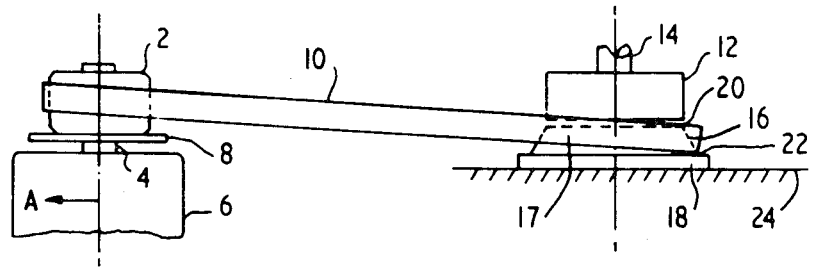
FIG. 1A is a schematic diagram of the belt drive arrangement in an inoperative position.

A driven pulley 12 is rigidly attached to a vertical shaft 14 supported by suitable bearings (not shown). Located below, adjacent and concentric with driven pulley 12 is a conical frustum 16 on a circular base plate 18. Conical frustum 16 tapers towards driven pulley 12 and the diameter of its upper surface 20 is approximately equal to the diameter of driven pulley 12. Conical frustum 16, shaft 14 and driven pulley 12 share a common vertical axis. Circular base plate 18 forms a ledge 22 around the base of conical frustum 16, and is fixed to a rigid support 24.

Drive pulley 2 and driven pulley 12 are in the same horizontal plane. Drive belt 10 has its length chosen so that it has a slack fit around drive pulley 2 and may extend around conical frustum 16 to rest on ledge 22. In this inoperative position, if power were applied to electric motor 6 to rotate drive pulley 2, belt 10 might rotate, but no power would be applied to driven pulley 12. It may be noted that in the inoperative position as shown in FIG. 1A, belt 10 is held loosely around drive pulley 2 and conical frustum 16 by gravity. As pulleys 2 and 12 are in the same horizontal plane, belt 10 is not horizontal and slopes downwards from flange 8 to ledge 22.

Electric motor 6 is pivotally mounted and may be moved in a direction indicated by arrow A to increase the distance between drive pulley 2 and drive pulley 12 whilst maintaining shaft 4 vertical. When electric motor 6 is moved, tension is applied to belt 10 which slides upwards on the surface of conical frustum 16 towards driven pulley 12. When electric motor 6 is switched on and rotates, drive motion indicated by arrow D is applied to belt 10 which assists transfer of the belt from conical frustum 16 to driven pulley 12 to rotate driven pulley 12 as shown in FIG. 1B.

In this figure belt 10 is shown in a horizontal drive position and remains in this position due to the centripetal action of crown pulley 2. When it is desired to remove the drive from driven pulley 12, electric motor 6 is switched off and moved as indicated by arrow B. Tension is removed from belt 10 which slides down the surface of conical frustum 16 and takes up the inoperative position as shown in FIG. 1A. It should be noted that in this position, driven pulley 12 attached to shaft 14 may be removed as belt 10 is resting on the surface of conical frustum 16.

Drive belt 10 is preferably a flat belt made of a plastics material which in an untensioned condition tends to form a circle. Conical frustum 16 may be of metal or of a plastics material and should have a smooth surface along which drive belt 10 may slide easily.

Figure 1B:
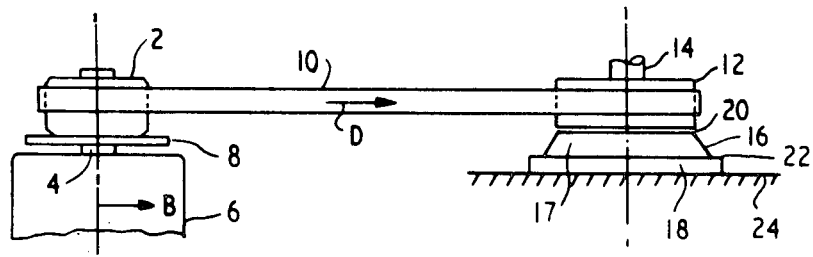
FIG. 1B shows the belt drive arrangement of FIG. 1A under drive conditions.

FIG. 1B shows drive belt 10 tensioned in a horizontal drive position, with shafts 4 and 14 vertical. However, although it is essential that shafts 4 and 14 should be parallel, there is no necessity for drive belt 10 to be horizontal when in the drive position. The belt drive arrangement may be used with drive belt 10 in a non-horizontal drive position provided that when tension is removed from drive belt 10 and motor 6 switched off, the belt 10 moves downwards under gravity to rest on ledge 8 or some other suitable support, and to rest on the surface of conical frustum 16 or an equivalent transfer device. Then when tension is applied again to belt 10 and motor 6 switched on, belt 10 will return to the drive position as previously described.

In FIGS. 1A. and 1B the belt transfer device is shown as conical frustum 16, as a cone is probably the easiest suitable shape to fabricate. It may be noted that only a portion of the surface of conical frustum 16 remote from drive pulley 2 is contacted by drive belt 10 and thus only this surface portion actually needs to be provided. Therefore only approximately one half of conical frustum 16 is essential and the half designated by 17 in FIG. 1A is redundant and could be removed.

Essentially the belt transfer device acts as a guide for belt 10 and must provide at least a surface on which drive belt 10 may be supported just before transferring to driven pulley 12, together with a surface tapering towards the curved surface to provide a rest position for drive belt 10. The surfaces need not be continuous and may be formed by an assembly of rods pointing towards driven pulley 12.

Although in FIGS. 1A and 1B, electric motor 6 is movable to tension drive belt 10, this tensioning may be accomplished by other methods. For example drive belt 10 may be tensioned by a movable idler pulley or driven pulley 12 and conical frustum 16 could be moved away from drive pulley 2.

The belt transfer arrangement as described with reference to FIGS. 1A and 1B has application in providing drive for magnetic disk files. A disk file in which a removable data module has an external drive pulley which is belt driven to rotate disks within the module is shown in the above referenced U.S. Pat. No. 3,786,454 (Lissner et al).

Figure 2:
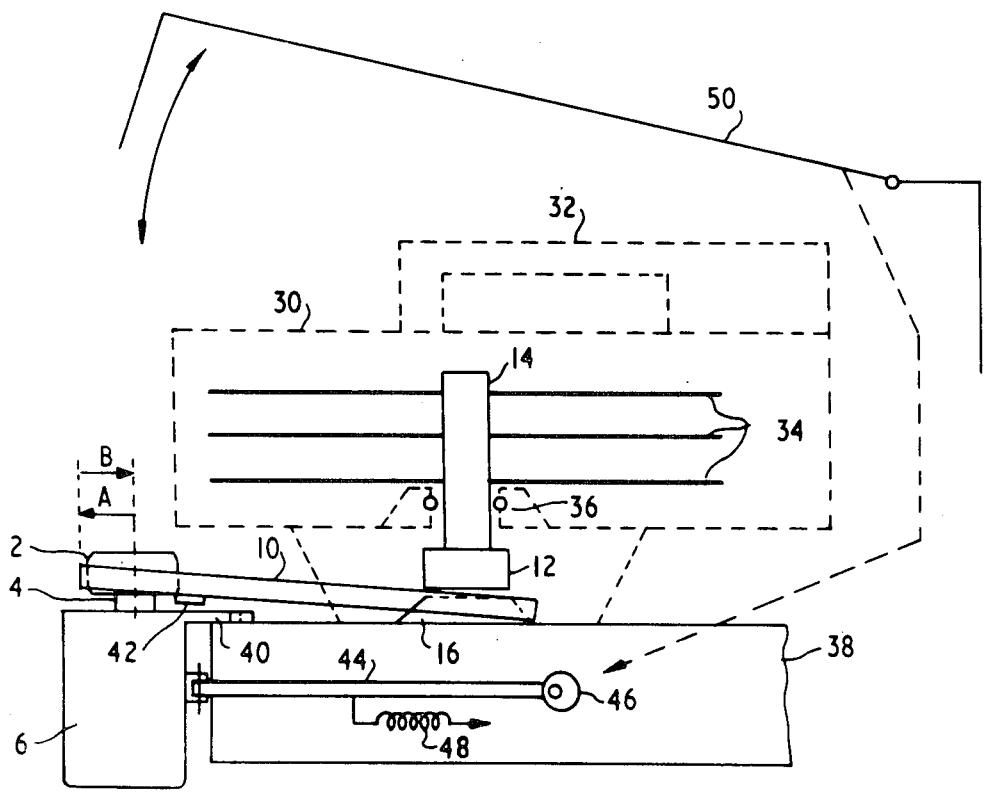
FIG. 2 illustrates the belt drive arrangement of FIGS. 1A and 1B applied to a magnetic disk file having an interchangeable disk pack.

Referring now to FIG. 2 which is a diagram illustrating an application of the invention to a magnetic disk file similar to that described in the Lissner et al patent. Whenever possible the same reference numerals for similar components are used as in FIGS. 1A and 1B. FIG. 2 shows an interchangeable disk module 30 in dotted outline with a carrying handle 32 shown in position locked to base plate 38. Disk module 30 contains magnetic disks 34 attached to shaft 14 mounted for rotation on bearings 36. The module also contains magnetic heads (not shown) for transducing data on the disks. A driven pulley 12 is attached to the lower end of shaft 14. A conical frustum 16 is mounted on base plate 38 below and concentric with driven pulley 12.

Electric motor 6 is mounted on plate 40 which is mounted on base plate 38 to pivot horizontally. Shaft 4 of electric motor 6 has a crown drive pulley 2 fixed to its upper end. A drive belt 10 is supported in position around drive pulley 2 by a support plate 42 attached to base plate 38. Drive belt 10 is shown in the inoperative position resting on conical frustum 16 as previously described with reference to FIG. 1A.

Electric motor 6 is held in the inoperative position by pivotally attached rod 44 being held against cam 46 by spring 48. Cam 46 is rotated by the act of closing lid 50 as indicated schematically by arrow 52 which represents actuation as described in detail in the aforementioned Lissner et al patent. This action moves rod 44 to the left as indicated by arrow A to pivot plate 40 and move drive pulley 2 into the drive position. Alternatively electric motor 6 may be moved by an electromagnetic actuator operated by a microswitch when lid 50 is closed. When electric motor 6 is started, drive belt 10 will transfer to driven pulley 12 as previously described with reference to FIG. 1B.

When it is required to remove disk pack 30, electric motor 6 is stopped, and lid 50 opened to rotate cam 46 and allow drive pulley 2 to move back to the inoperative position as indicated by arrow B. This places drive belt 10 in the inoperative position resting on conical frustum 16 below driven pulley 12. Thus disk module 30 may be removed and replaced by another disk module.

The invention provides a simple belt loading and unloading arrangement which is particularly useful in applications where the driven pulley is in an inaccessible position. In most applications involving continuously running machinery it is usual and desirable for the drive arrangements to be permanently connected. However, there are some applications in which the drive needs to be disconnected from time to time and subsequently reconnected. Such applications include:

(i) disk stores in which disk modules having an external drive pulley are connected in use to a belt drive in a drive unit;
(ii) test equipment in which the apparatus to be tested is temporarily connected to a belt drive in the test equipment before being connected to a permanent drive in a using system: and
(iii) an alternative to inertia clutch arrangements for driving large loads where the driving means is incapable of starting under load conditions. Belt slip during transfer of the moving belt from transfer device to driven pulley enables the driven pulley to be accelerated under relatively high load condition.

What is claimed is:

1. A system for automatically loading and unloading a drive belt onto a driven pulley which is permanently associated with a replaceable device which is removable in a non-horizontal direction parallel to the axis of rotation of said driven pulley,
    said system comprising:
    (1) means for supporting said device with the axis of rotation of said driven pulley substantially parallel to said direction and in a non-horizontal plane;
    (2) means positioned between said device supporting means and the said driven pulley and non-removably attached to said supporting means for guiding a drive belt from a first untensioned position to a second tensioned position on said driven pulley, said guide means including at least one surface sloping towards said driven pulley from said supporting means defining a portion of a conical frustum having its axis positioned coaxially with the axis of rotation of said driven pulley and a belt support surface extending normal to the axis of said frustum;
    (3) a driving pulley having an axis of rotation substantially parallel to said axis of rotation of said driven pulley and positioned in substantially the same plane as said driven pulley;
    (4) means permanently associated with said driving pulley for preventing gravity from disengaging said belt completely from said driving pulley when the belt is not under tension; and
    (5) means for applying tension to said belt when said belt is in said first position to cause said guide means to automatically transfer said belt to said driven pulley as said driving pulley is rotated and to transfer said belt to said guiding surface by gravity when said tension is released and said driving pulley stops.

2. The system defined by claim 1 in which said means for applying tension includes means for causing relative movement between said pulleys in said plane to increase the distance between their respective said axes of rotation.

3. The combination recited in claim 1 in which said guiding means comprise a conical frustum.

4. The combination recited in claim 3 in which said driving pulley is a crown pulley.

5. The combination recited in claim 1 further comprising means for controlling said tension applying means in accordance with the position of said removable device.

6. The combination recited in 1 in which said device is a data module.

* * * * *